Patented June 2, 1942

2,285,259

UNITED STATES PATENT OFFICE 2,285,259

PRESERVATION OF RUBBER

Frederick B. Downing, Carneys Point, N. J., Arthur M. Neal, Wilmington, Del., and Charles J. Pedersen, Penns Grove, N. J., assignors to E. I. du Pont de Nemours & Company, Wilmington, Del., a corporation of Delaware No Drawing. Application December 29, 1937, Serial No. 182,374

15 Claims. (Cl. 260—802)

This invention relates to the preservation of rubber, particularly in the presence of copper and its compounds which catalyze the deterioration of rubber due to the action of heat and oxidation.

It is well known that certain substances, for example the secondary aromatic amines, possess the power of retarding that deterioration of rubber which is due to heat and oxidation. It is also well known that copper and its compounds are extremely active catalyzers of deterioration due to oxidation. Thus as small an amount of copper stearate as .001% based on the rubber will increase the rate of deterioration due to heat and oxidation several hundred percent. This great catalytic activity of copper necessitates expensive and tedious processes to insure that all copper is removed from compounding agents. It is also necessary to be sure that no copper is introduced through contamination during the processing of the rubber. It has been proposed heretofore to overcome this catalytic action through the use of well known antioxidants such as phenyl-b-naphthylamine. Such compounds, however, are relatively ineffective in overcoming the catalytic action of the copper.

An object of the present invention is to provide a new class of compounds which are effective in overcoming the catalytic action of copper on that deterioration which rubber normally undergoes due to the action of heat and oxidation. A further object is to retard the deterioration of rubber due to heat and oxidation even in the presence of copper and its compounds which normally accelerate such deterioration. A still further object is to render the usual rubber antioxidants effective even in the presence of copper and its compounds in the presence of which such antioxidants are usually relatively ineffective. Other objects are to provide new compositions of matter and to advance the art. Still other objects will appear hereinafter.

These objects may be accomplished in accordance with our invention which comprises incorporating in the rubber a small amount of an organic compound containing an ortho-hydroxy aromatic group and a tertiary nitrogen having two valencies satisfied by a single carbon atom and a small amount of a rubber antioxidant of a different type. The organic compound above referred to is a type of arylidene amine or Schiff's base, obtained by condensing one mole of a polyamine, containing at least two primary amino groups capable of reacting with aromatic aldehydes to form arylidene amines, with at least two moles of an ortho-hydroxy substituted aldehyde which is aromatic in nature, so that not more than one mole of aldehyde reacts for each primary amino group of the amine.

The polyamine may be any aliphatic amine containing at least two primary amino groups directly attached to different carbon atoms of the same open chain and which amine may contain aromatic or other cyclic groups substituted on the chain. The term "aliphatic polyamine" as employed hereinafter and in the claims will be understood to have the foregoing meaning. The polyamine may be an aromatic or other cyclic amine having at least two primary amino groups attached to different substantially adjacent atoms of the ring or rings, either directly or through one or more atoms which are not members of the rings. The preferred polyamines are those consisting of carbon, hydrogen and nitrogen, those in which at least two primary amino groups are directly attached to adjacent carbon atoms, and particularly the diamines.

By "substantially adjacent atoms," we mean only ring atoms directly bonded together and ring atoms located in different nuclei of polynuclear compounds which ring atoms are the two atoms, not common to two rings nor forming part of the linkage between two rings, nearest to each other. By "adjacent atoms," we mean atoms directly bonded together. By "polynuclear compounds," we mean to include compounds containing two or more rings having no ring carbon atoms in common as well as fused ring compounds.

By an "ortho-hydroxy substituted aldehyde," we mean one in which the hydroxy group and the aldehyde, or —CHO, group are directly bonded to adjacent ring carbon atoms. By the term "aldehyde, aromatic in nature," we intend to include the unsaturated cyclic aldehydes, such as the pyridine and quinoline aldehydes, which have many of the characteristic properties of the aromatic aldehydes, as well as the strictly aromatic aldehydes in which the hydroxy and aldehyde groups are bonded to nuclear carbon atoms of an aromatic ring.

The aldehyde is preferably an aromatic aldehyde and also preferably one devoid of substituents other than hydrocarbon and hydroxy groups. However, such aldehyde may contain, as substituents, alkoxy, aryloxy, halogen, heterocyclic, amino, cyano, carboxyl and sulfonic groups as well as hydroxy, alkyl and aryl radicals. The polyamine may be likewise substituted but is preferably unsubstituted.

Compounds of this type are well known and methods of making them are described by Mason, Ber. 20 267–277 (1887) and Haegele Ber. 25 2753–2756 (1892). They are further discussed by N. U. Sidgwick in his books "The Electronic Theory of Valency" Oxford 1927 and "The Covalent Link in Chemistry," Cornell 1933.

The above compounds are, in general, relatively ineffective in retarding that deterioration which rubber undergoes due to heat and oxidation, in the absence of metal catalysts, and hence they are not valuable commercially as antioxidants. However, we have found that, when such compounds are employed in rubber and in the presence of an antioxidant of a different type, they tend to inhibit or neutralize the catalytic effect of copper and its compounds, and hence are hereinafter named copper deactivators, for convenience. In inhibiting the deterioration of rubber due to heat and oxidation the usual antioxidants are substantially ineffective in the presence of copper and its compounds when such antioxidants are employed alone. Our compounds, when employed alone, have little if any preservative effect on rubber whether in the presence or absence of copper and its compounds.

The quantity of copper deactivator added will be dependent upon the amount of copper present in the rubber. At least one mole of copper deactivator must be added for each atom of copper in the rubber. Preferably, from about 1.5 to about 100 moles of copper deactivator is used for each atom of copper in the rubber. From about 0.0002 to about 1.0% of copper deactivator based on the rubber will generally be satisfactory in most rubber compositions where the copper or its compound is accidentally present. Higher ratios of copper deactivator may be used, particularly when the rubber is in contact with metallic copper in bulk which forms a reservoir of copper ions.

In order to test these compounds, the following stocks were prepared.

|  | A | B | C | D | E |
|---|---|---|---|---|---|
| Pale crepe | 100 | 100 | 100 | 100 | 100 |
| Zinc oxide | 100 | 100 | 100 | 100 | 100 |
| Sulfur | 3 | 3 | 3 | 3 | 3 |
| Stearic acid | 1 | 1 | 1 | 1 | 1 |
| Lithopone | 20 | 20 | 20 | 20 | 20 |
| Di-ortho tolyl guanidine | 0.75 | 0.75 | 0.75 | 0.75 | 0.75 |
| Phenyl-b-naphthylamine | 1.00 | 1.00 | 1.00 | 1.00 | 1.00 |
| Copper stearate |  | .05 | 0.1 | .05 | 0.1 |
| Di-salicylal ethylenediamine |  |  |  | 0.5 | 0.5 |

These stocks were cured for 45 minutes at 40 lbs. steam pressure. They were tested by hanging samples in a Bierer Davis bomb at 70° C. and 300 lbs. oxygen pressure for 5 days and then determining their physical properties. The results of this test are given in Table I.

Table I

| Stock | Tensile original | Tensile after 5 days |
|---|---|---|
| A | 3,875 | 2,275 |
| B | 3,950 | 675 |
| C | 3,850 | (1) |
| D | 3,800 | 2,275 |
| E | 3,875 | 2,075 |

[1] Completely deteriorated in 2 days.

It will be seen from this table that, whereas phenyl-b-naphthylamine is an extremely powerful antioxidant as shown by test A, it is relatively ineffective when the oxidation is catalyzed by the presence of copper salts, tests B and C. It will be seen, however, that di-salicylal ethylene diamine overcomes the catalytic action of copper almost completely. Thus stocks D and E, which contain this compound in addition to the copper, are substantially as good after aging as stock A which contains no copper.

In order to still further test these compounds, the following stocks were prepared:

|  | A | B | C |
|---|---|---|---|
| Pale crepe | 100 | 100 | 100 |
| Zinc oxide | 100 | 100 | 100 |
| Sulfur | 3 | 3 | 3 |
| Stearic acid | 1 | 1 | 1 |
| Lithopone | 20 | 20 | 20 |
| Di-ortho-tolyl-guanidine | 0.75 | 0.75 | 0.75 |
| Phenyl-b-naphthylamine | 1.0 | 1.0 | 1.0 |
| Copper stearate |  | 0.05 | 0.05 |
| Disalicylal-o-phenylene diamine |  |  | 0.5 |

These stocks were cured for 45 minutes at 40 lbs. steam pressure. They were tested by charging samples in a Bierer Davis bomb at 70° C. and 300 lbs. oxygen pressure for 5 days and then determining their physical properties. The results of this test are given in the following Table IA:

Table IA

| Stock | Tensile original | Tensile after 5 days |
|---|---|---|
| A | 3,675 | 2,825 |
| B | 3,750 | (1) |
| C | 3,675 | 2,600 |

[1] Completely deteriorated.

These tests show that disalicylal-o-phenylene diamine is also a very effective compound in overcoming the catalytic effect of copper. Thus, while phenyl-b-naphthylamine is relatively ineffective in the presence of copper, the disalicylal-o-phenylene diamine inhibits the action of copper and renders the phenyl-b-naphthylamine effective.

In order to show that this remarkable increase in effectiveness was due to overcoming the catalytic activity of the copper and not merely an additive effect due to the increased concentration of antioxidant, the following stocks were prepared:

|  | A | B |
|---|---|---|
| Pale crepe | 100 | 100 |
| Zinc oxide | 100 | 100 |
| Sulfur | 3 | 3 |
| Stearic acid | 1 | 1 |
| Lithopone | 20 | 20 |
| Di-ortho tolyl guanidine | .75 | .75 |
| Phenyl-b-naphthylamine | 1.00 | 1.00 |
| Di-salicylal ethylene diamine |  | 0.5 |

These stocks were cured for 45 minutes at 40 lbs. steam pressure. They were tested by the same "oxygen bomb" test described above. The results of this test are given in Table II.

Table II

| Stock | Tensile original | Tensile after 7 days |
|---|---|---|
| A | 3,825 | 2,550 |
| B | 3,900 | 2,325 |

These tests show that there is little or no improvement in the normal aging of stocks containing phenyl-b-naphthylamine when these copper inhibitors are added in the absence of copper or its compounds which act as catalyzers of oxidation.

In order to further show that the results obtained are due to the combined action of the compounds and not due to either one alone, tests were made with the following stocks:

|  | A | B | C | D |
|---|---|---|---|---|
| Pale crepe | 100 | 100 | 100 | 100 |
| Zinc oxide | 100 | 100 | 100 | 100 |
| Sulfur | 3 | 3 | 3 | 3 |
| Stearic acid | 1 | 1 | 1 | 1 |
| Lithopone | 20 | 20 | 20 | 20 |
| Di ortho tolyl guanidine | 0.75 | 0.75 | 0.75 | 0.75 |
| Copper stearate | 0.05 | 0.1 | 0.05 | 0.1 |
| Phenyl-b-naphthylamine | 1.0 | 1.0 |  |  |
| Di-salicylal ethylene diamine |  |  | 1.0 | 1.0 |

These stocks were cured for 45 minutes at 40 lbs. steam pressure. They were tested by hanging samples in a Bierer-Davis bomb at 70° C. and 300 lbs. oxygen pressure for 3 days and then determining their physical properties. The results of this test are given in Table III.

Table III

| Stock | Tensile original | Tensile after 3 days in bomb |
|---|---|---|
| A | 3,375 | Completely deteriorated. |
| B | 3,275 | Do. |
| C | 3,275 | Do. |
| D | 3,675 | Do. |

When a rubber stock is prepared similar to those tested but omitting both the copper stearate and the antioxidant, it will likewise be completely deteriorated in 3 days. Accordingly, it appears that these compounds of our invention destroy or neutralize the catalytic effect of the copper and its compounds and thus permit the antioxidants to exert their usual action without interference from the copper and its compounds.

These compounds are also effective when used in conjunction with other known antioxidants. This is shown by tests made with the following stocks:

|  | A | B | C |
|---|---|---|---|
| Pale crepe | 100 | 100 | 100 |
| Zinc oxide | 10 | 10 | 10 |
| Whiting | 56 | 56 | 56 |
| "Titone"[1] | 75 | 75 | 75 |
| Stearic acid | 1.9 | 1.9 | 1.9 |
| "Heliozone"[2] | 1.25 | 1.25 | 1.25 |
| Salicylic acid | .625 | .625 | .62 |
| Sulfur | 1.875 | 1.875 | 1.87 |
| "Acrin"[3] (accelerator) | 1.25 | 1.25 | 1.25 |
| "Antox"[4] (butyraldehyde aniline antioxidant) | 1.25 | 1.25 | 1.25 |
| Copper stearate |  | .05 | .05 |
| Di-salicylal-ethylene diamine |  |  | .5 |

[1] Titone is a titanium reenforced lithopone containing about 15% titanium dioxide, 60% barium sulfate, and 25% zinc sulfide. (See "Compounding Ingredients for Rubber," copyright 1936, Bill Brothers Publishing Company, p. 147).
[2] Heliozone is the trade name of a specially selected group of waxy materials. (See "Compounding Ingredients for Rubber," Bill Brothers Publishing Company, 1936, p. 72).
[3] Acrin is the trade name of an accelerator made by condensing hexamethylene tetramine, benzyl chloride, and 2-mercaptobenzothiazole according to the disclosure of United States Patent 1,878,654.
[4] Antox is the trade name of the butyraldehyde-aniline condensation product made according to United States Patent 1,939,192.

These stocks were cured in 30 lbs. air pressure with a one hour rise to 250° F. followed by a half hour at 250° F. The aging properties of these stocks were determined in the oxygen bomb by the usual Bierer Davis test. The results of this test are given in Table IV.

Table IV

| Stock | Original tensile | Tensile after 7 days |
|---|---|---|
| A | 2,475 | 2,150 |
| B | 2,550 | (¹) |
| C | 2,325 | 1,775 |

¹ Completely deteriorated.

It can be seen from this table that, in this test also, where a butyraldehyde-aniline condensation product was used in place of phenyl-b-naphthylamine, the compounds disclosed are effective in overcoming the catalytic activity of copper.

Although tests have been disclosed in which these compounds are used with either phenyl-b-naphthylamine or butyraldehyde-aniline as antioxidants, they may be used with any of the known antioxidants for rubber. Examples of other compounds, which may be used as antioxidants along with the inhibitors for copper, are phenyl-a-naphthylamine, acetone-diphenylamine, acetone-aniline condensation products and their polymerization products, diphenylethylene-diamine, acetaldehyde-aniline, aldol-a-naphthylamine, p(OH) phenyl morpholine, dicatechol borate, diphenylamine, diphenyl-p-phenylene diamine, di-b-naphthyl-p-phenylene diamine, 4(p-toluene sulfonyl amino)4' methyl diphenylamine, etc.

Examples of other compounds, which act as inhibitors of the catalytic oxidation due to the presence of copper, are the following:

Di-salicylal 1,6 hexylene diamine
Di-salicylal 1,2-diamino benzene
Di-(2(OH) 3(OCH₃) benzal) propylene diamine
Di-salicylal propylene diamine
Di-(2(OH) 3(OCH₃) benzal) ethylene diamine
Di-(2(OH) benzal) diethylene-triamine
Di-salicylal triethylene tetramine
Di-(2(OH) 4-methyl benzal) ethylene diamine Other effective copper deactivators for inhibiting the action of copper and its compounds on the oxidation of rubber may be made by condensing each of the following aldehydes with each of the following polyamines:

| Aldehydes | Polyamines |
|---|---|
| 2(OH) benzaldehyde | Methylene diamine |
| 2(OH) 5-chlorobenzaldehyde | Ethylene diamine |
| 2(OH) 3,5-dibromobenzaldehyde | 1,2-propylene diamine |
| 2(OH) 3-nitrobenzaldehyde | 1,3-propylene diamine |
| 2(OH) 6-methyl benzaldehyde | 1,10-decylene diamine |
| 2(OH) 3-methoxy benzaldehyde | Diethylene triamine |
| 2,4 di(OH) benzaldehyde | Triethylene tetramine |
| 2,6 di(OH) benzaldehyde | Pentaerythrityl tetramine |
| 2(OH) 3-cyanobenzaldehyde | 1,2-diamino cyclohexane |
| 2(OH) 3-carboxybenzaldehyde | 1,2-diamino benzene |
| 2(OH) benzaldehyde-3-sulfonic acid | 2,3-diamino pyridine |
|  | 2,3-diamino naphthridine-1,4 |
| 2(OH) naphthaldehyde-1 | 4,5-diamino quinoline |
| 1(OH) naphthaldehyde-2 | 1,8-diamino naphthalene |
| Anthrol-2-aldehyde-1 | 1,2-diamino anthraquinone |
| 2(OH) fluorene-aldehyde-1 | 3,4-diamino diphenyl |
| 4(OH) diphenyl aldehyde-3 | 9,10-diamino phenanthrene |
| 3(OH) phenanthrene aldehyde-4 | 3,4-toluylene diamine |
| 1,3 di(OH)-2,4-dialdehydrobenzene | 2,2'-diamino diphenyl |
|  | 4:5-diamino phenanthrene |
| 4(OH) pyridine-aldehyde-3 |  |
| 4(OH) quinoline-aldehyde-3 |  |
| 7(OH) quinoline-aldehyde-8 |  |
| 2(OH) furfuryl aldehyde |  |

In all of the tests disclosed, the compounds were added according to the usual methods of incorporating before vulcanization. It should be pointed out, however, that they can be used as effectively by incorporating them into the rubber stock after vulcanization by any of the well known processes of diffusion. These compounds can also be used effectively by introducing them into latex, either natural or synthetic.

When we refer to the catalytic effect of copper herein and in the claims, it will be understood that we refer to copper in the form of its salts or other catalytically active compounds as well as in the form of the pure metal.

While we have disclosed the preferred embodiments of our invention, it will be readily apparent to those skilled in the art that many variations and modifications may be made therein without departing from the spirit of our invention. Accordingly, the scope of our invention is to be limited solely by the appended claims, construed as broadly as is permissible in view of the prior art.

We claim:

1. The method of retarding the deterioration of vulcanized rubber, due to the catalytic effect of copper in contact with the rubber, in the presence of an antioxidant which is normally effective to materially retard the deterioration of the vulcanized rubber due to light, heat and oxidation in the absence of copper but which is less effective in the presence of copper, which comprises incorporating in the rubber in the proportion of from about 0.5% to about 1.0%, sufficient to inhibit the catalytic effect of copper, a copper deactivator identical with the compound obtained by condensing 1 mole of a primary aliphatic polyamine solely with at least 2 moles of an ortho hydroxy substituted aldehyde, aromatic in nature, so that not more than 1 mole of aldehyde reacts for each primary amino group of the polyamine, said polyamine containing at least two primary amino groups directly attached to different carbon atoms of the same open chain.

2. The method of retarding the deterioration of vulcanized rubber due to the catalytic effect of copper in contact with the rubber, in the presence of an antioxidant which is normally effective to materially retard the deterioration of the vulcanized rubber due to light, heat and oxidation in the absence of copper but which is less effective in the presence of copper, which comprises incorporating in the rubber in the proportion of from about 0.5 to about 1.0%, sufficient to inhibit the catalytic effect of copper, a copper deactivator identical with the compound obtained by condensing 1 mole of a primary aliphatic polyamine solely with at least 2 moles of an ortho hydroxy substituted aromatic aldehyde, so that not more than 1 mole of aldehyde reacts for each primary amino group of the polyamine, said polyamine containing at least two primary amino groups directly attached to different carbon atoms of the same open chain.

3. The method of retarding the deterioration of vulcanized rubber, due to the catalytic effect of copper in contact with the rubber, in the presence of an antioxidant which is normally effective to materially retard the deterioration of the vulcanized rubber due to light, heat and oxidation in the absence of copper but which is less effective in the presence of copper, which comprises incorporating in the rubber in the proportion of from about 0.5% to about 1.0%, sufficient to inhibit the catalytic effect of copper, a copper deactivator identical with the compound obtained by condensing 1 mole of a primary aliphatic polyamine solely with at least 2 moles of an ortho hydroxy substituted aromatic aldehyde, so that not more than 1 mole of aldehyde reacts for each primary amino group of the polyamine, said polyamine consisting of carbon, hydrogen and nitrogen and containing at least two primary amino groups directly attached to different carbon atoms of the same open chain, and said aldehyde consisting of the elements carbon, hydrogen and oxygen.

4. The method of retarding the deterioration of vulcanized rubber, due to the catalytic effect of copper in contact with the rubber, in the presence of an antioxidant which is normally effective to materially retard the deterioration of the vulcanized rubber due to light, heat and oxidation in the absence of copper but which is less effective in the presence of copper, which comprises incorporating in the rubber in the proportion of from about 0.5% to about 1.0%, sufficient to inhibit the catalytic effect of copper, di-salicylal ethylene diamine.

5. The method of retarding the deterioration of vulcanized rubber, due to the catalytic effect of copper in contact with the rubber, in the presence of phenyl-b-naphthylamine, which comprises incorporating in the rubber in the proportion of from about 0.5% to about 1.0%, sufficient to inhibit the catalytic effect of copper, di-salicylal ethylene diamine.

6. The method of retarding the deterioration of vulcanized rubber, due to the catalytic effect of copper in contact with the rubber, in the presence of a butyraldehyde-aniline antioxidant, which comprises incorporating in the rubber in the proportion of from about 0.5% to about 1.0%, sufficient to inhibit the catalytic effect of copper, di-salicylal ethylene diamine.

7. The method of retarding the deterioration of vulcanized rubber, due to the catalytic effect of copper in contact with the rubber, in the presence of acetone-diphenylamine, which comprises incorporating in the rubber in the proportion of from about 0.5% to about 1.0%, sufficient to inhibit the catalytic effect of copper, di-salicylal ethylene diamine.

8. Vulcanized rubber having incorporated therein a small amount of an antioxidant which is normally effective to materially retard the deterioration of the rubber due to light, heat and oxidation in the absence of copper but which is less effective in the presence of copper, and from about 0.5% to about 1.0%, sufficient to inhibit the catalytic effect of copper, of a copper deactivator identical with the compound obtained by condensing 1 mole of a primary aliphatic polyamine solely with at least 2 moles of an ortho hydroxy substituted aldehyde, aromatic in nature, so that no more than 1 mole of aldehyde reacts for each primary amino group of the polyamine, said polyamine containing at least two primary amino groups directly attached to different carbon atoms of the same open chain.

9. Vulcanized rubber having incorporated therein a small amount of an antioxidant which is normally effective to materially retard the deterioration of the rubber due to light, heat and oxidation in the absence of copper but which is less effective in the presence of copper, and from about 0.5% to about 1.0%, sufficient to inhibit the catalytic effect of copper, of a copper deactivator identical with the compound obtained by condensing 1 mole of a primary aliphatic polyamine solely with at least 2 moles of an ortho hydroxy substituted aromatic aldehyde, so that not more than 1 mole of aldehyde reacts for each primary amino group of the polyamine, said polyamine containing at least two primary amino groups directly attached to different carbon atoms of the same open chain.

10. Vulcanized rubber having incorporated therein a small amount of an antioxidant which is normally effective to materially retard the deterioration of the rubber due to light, heat and oxidation in the absence of copper but which is less effective in the presence of copper, and from about 0.5% to about 1.0%, sufficient to inhibit the catalytic effect of copper, of a copper deactivator identical with the compound obtained by condensing 1 mole of a primary aliphatic polyamine solely with at least 2 moles of an ortho hydroxy substituted aromatic aldehyde, so that not more than 1 mole of aldehyde reacts for each primary amino group of the polyamine, said polyamine consisting of carbon, hydrogen and nitrogen and containing at least two primary amino groups directly attached to different carbon atoms of the same open chain, and said aldehyde consisting of the elements carbon, hydrogen and oxygen.

11. Vulcanized rubber having incorporated therein a small amount of an antioxidant which is normally effective to materially retard the deterioration of the rubber due to light, heat and oxidation in the absence of copper but which is less effective in the presence of copper, and from about 0.5% to about 1.0%, sufficient to inhibit the catalytic effect of copper, of a copper deactivator identical with the compound obtained by condensing 1 mole of an alkylene diamine solely with 2 moles of an ortho hydroxy aromatic aldehyde, so that not more than 1 mole of aldehyde reacts for each primary amino group of the amine, said diamine containing the two primary amino groups directly attached to different carbon atoms of the same open chain, and said aldehyde consisting of the elements carbon, hydrogen and oxygen.

12. Vulcanized rubber having incorporated therein a small amount of an antioxidant which is normally effective to materially retard the deterioration of the rubber due to light, heat and oxidation in the absence of copper but which is less effective in the presence of copper, and from about 0.5% to about 1.0%, sufficient to inhibit the catalytic effect of copper, of di-salicylal ethylene diamine.

13. Vulcanized rubber having incorporated therein a small amount of phenyl-b-naphthylamine, and from about 0.5% to about 1.0%, sufficient to inhibit the catalytic effect of copper, of di-salicylal ethylene diamine.

14. Vulcanized rubber having incorporated therein a small amount of a butyraldehyde-aniline antioxidant, and from about 0.5% to about 1.0%, sufficient to inhibit the catalytic effect of copper, of di-salicylal ethylene diamine.

15. Vulcanized rubber having incorporated therein a small amount of acetone-diphenylamine, and from about 0.5% to about 1.0%, sufficient to inhibit the catalytic effect of copper, of di-salicylal ethylene diamine.

FREDERICK B. DOWNING.
ARTHUR M. NEAL.
CHARLES J. PEDERSEN.